(12) United States Patent
Vitello et al.

(10) Patent No.: US 8,714,534 B2
(45) Date of Patent: May 6, 2014

(54) SUPPORT ASSEMBLY FOR SERVICING A STATOR FRAME THAT USES SPRING ASSEMBLIES TO SUPPORT A STATOR CORE

(75) Inventors: Travis J. Vitello, DeBary, FL (US); David T. Allen, Longwood, FL (US)

(73) Assignee: Siemens Energy, Inc., Orlando, FL (US)

( * ) Notice: Subject to any disclaimer, the term of this patent is extended or adjusted under 35 U.S.C. 154(b) by 84 days.

(21) Appl. No.: 13/469,548

(22) Filed: May 11, 2012

(65) Prior Publication Data

US 2013/0300046 A1    Nov. 14, 2013

(51) Int. Cl.
 *B23Q 1/25*    (2006.01)

(52) U.S. Cl.
 USPC .................. 269/55; 269/56; 269/58; 310/66; 310/91

(58) Field of Classification Search
 USPC .............................. 269/55, 56, 58; 310/66, 91
 See application file for complete search history.

(56) References Cited

U.S. PATENT DOCUMENTS

| | | | |
|---|---|---|---|
| 4,327,303 A | 4/1982 | Jacobsen | |
| 4,425,523 A * | 1/1984 | Detinko et al. | 310/433 |
| 5,875,540 A | 3/1999 | Sargeant et al. | |
| 6,104,116 A | 8/2000 | Fuller et al. | |
| 6,144,129 A * | 11/2000 | Fuller et al. | 310/91 |
| 7,202,587 B2 | 4/2007 | Sargeant et al. | |
| 7,302,754 B2 | 12/2007 | Majernik et al. | |
| 7,353,586 B2 | 4/2008 | Majernik et al. | |
| 7,395,594 B2 | 7/2008 | Allen et al. | |
| 7,653,986 B2 | 2/2010 | Majernik et al. | |
| 7,946,028 B2 * | 5/2011 | Majernik et al. | 29/732 |
| 2005/0235479 A1 | 10/2005 | Allen et al. | |
| 2005/0235480 A1 | 10/2005 | Majernik et al. | |
| 2008/0042514 A1 | 2/2008 | Cook et al. | |
| 2009/0235516 A1 | 9/2009 | Notarange et al. | |
| 2011/0214281 A1 | 9/2011 | Majernik et al. | |

* cited by examiner

*Primary Examiner* — Lee D Wilson
*Assistant Examiner* — Shantese McDonald (57) ABSTRACT

A support assembly for servicing a stator frame of a power generator includes a plurality of rails and a trolley. The rails are supported on frame rings of a main housing of the stator frame. The rails have upper surfaces that provide temporary support for lower support surfaces of second laminations of a second stator core once the second laminations are inserted into desired axial positions within the main housing. The trolley is provided for axial movement on the upper surfaces of the rails for inserting the second laminations into the main housing. The trolley includes a lamination-engaging portion including a lamination support surface for supporting upper support surfaces of the second laminations and a plurality of rail wheels provided for axial movement of the trolley within the main housing on the upper surfaces of the rails.

20 Claims, 7 Drawing Sheets

SUPPORT ASSEMBLY FOR SERVICING A STATOR FRAME THAT USES SPRING ASSEMBLIES TO SUPPORT A STATOR CORE

FIELD OF THE INVENTION

The present invention relates to a support assembly for servicing stator frames of power generators, and more particularly, to a support assembly for servicing a stator frame, while in a horizontal position, which uses spring assemblies to support a stator core.

BACKGROUND OF THE INVENTION

U.S. Pat. No. 5,875,540, the entire disclosure of which is incorporated by reference herein, discloses a process for forming a stator core in a stator frame. The process involves forming a plurality of core modules or donuts, each of which comprises a plurality of stator core rings laminated together. The stator frame is placed in an upright position. A predefined number of the core modules are then lowered into the upright stator frame. For a power generator which has been in operation for some time and is in need of a new stator core, turning its stator frame upright to receive a new stator core can be very difficult.

U.S. Pat. Nos. 7,302,754; 7,353,586; and 7,395,594, the entire disclosures of which are incorporated by reference herein, are directed at installing stator cores into stator frames without placing the stator frame in an upright position. U.S. Pat. No. 7,202,587, the entire disclosure of which is also incorporated by reference herein, discloses mounting stator core donuts having enlarged grooves in a stator frame using wedges that disperse forces to the donuts in a circumferential manner. The enlarged grooves make installing the donuts less difficult, while the wedges ensure a tight fit of the laminations within the stator frame. U.S. Patent Application Publication No. 2009/0235516, the entire disclosure of which is also incorporated by reference herein, discloses removing a first stator core from a stator frame, servicing frame beams of the stator frame, and installing new keybars into the stator frame such that a second stator core can be inserted into the stator frame. Each of these patents/published applications involves installing stator cores into stator frames that use keybars, otherwise known as building bolts, to directly support the stator core in the stator frame.

SUMMARY OF THE INVENTION

In accordance with a first aspect of the present invention, a support assembly is provided for servicing a stator frame of a power generator. The stator frame includes a main housing having a first end and an axially spaced apart second end. The stator frame supports a stator core formed by a plurality of laminations, which have grooves formed in outer surfaces thereof for receiving respective axially extending keybars to couple the keybars to the laminations. The stator frame further includes a plurality of spring assemblies having spring members affixed to frame rings of the main housing, spacer blocks for providing a gap between the laminations of the stator core and the spring members, and fastening hardware that is used to attach the keybars provided in the grooves of the laminations to the spring members so as to structurally support the stator core within the main housing. The support assembly comprises a plurality of rails, a backstop structure, and a trolley. The rails are supported on the frame rings of the main housing and extend axially within a bottom portion of the main housing. The rails have upper surfaces that provide temporary support for lower support surfaces of second laminations of a second stator core once the second laminations are inserted into desired axial positions within the main housing. The backstop structure is affixed to the main housing to provide axial positioning for the second laminations of the second stator core within the main housing. The trolley is provided for axial movement on the upper surfaces of the rails for inserting the second laminations into the main housing. The trolley comprises a lamination-engaging portion including a lamination support surface for supporting upper support surfaces of the second laminations and a plurality of rail wheels provided for axial movement of the trolley within the main housing on the upper surfaces of the rails.

In accordance with a second aspect of the present invention, a support assembly is provided for servicing a stator frame of a power generator. The stator frame includes a main housing having a first end and an axially spaced apart second end. The stator frame supports a stator core formed by a plurality of laminations, which have grooves formed in outer surfaces thereof for receiving respective axially extending keybars to couple the keybars to the laminations. The stator frame further includes a plurality of spring assemblies having spring members affixed to frame rings of the main housing, spacer blocks for providing a gap between the laminations of the stator core and the spring members, and fastening hardware that is used to attach the keybars provided in the grooves of the laminations to the spring members so as to structurally support the stator core within the main housing. The support assembly comprises a plurality of rails and a trolley. The rails are supported on the frame rings of the main housing and extending axially within a bottom portion of the main housing. The rails have upper surfaces that provide temporary support for lower support surfaces of second laminations of a second stator core once the second laminations are inserted into desired axial positions within the main housing. The trolley is provided for axial movement on the upper surfaces of the rails for inserting the second laminations into the main housing. The trolley comprises a lamination-engaging portion, plurality of rail wheels, and at least one deck wheel. The lamination-engaging portion includes a lamination support surface for supporting upper support surfaces of the second laminations. The rail wheels are provided for axial movement of the trolley within the main housing on the upper surfaces of the rails. At least some of the rail wheels are movable from rail engaging positions when in the main housing to floating positions when out of the main housing. The at least one deck wheel is provided for axial movement of the trolley outside of the main housing on a floor surface.

In accordance with a third aspect of the present invention, a support assembly is provided for servicing a stator frame of a power generator. The stator frame includes a main housing having a first end and an axially spaced apart second end. The stator frame supports a stator core formed by a plurality of laminations, which have grooves formed in outer surfaces thereof for receiving respective axially extending keybars to couple the keybars to the laminations. The stator frame further includes a plurality of spring assemblies having spring members affixed to frame rings of the main housing, spacer blocks for providing a gap between the laminations of the stator core and the spring members, and fastening hardware that is used to attach the keybars provided in the grooves of the laminations to the spring members so as to structurally support the stator core within the main housing. The support assembly comprises a plurality of rails and a trolley. The rails are supported on the frame rings of the main housing and extend axially within a bottom portion of the main housing. The rails have upper surfaces that provide temporary support for lower support surfaces of second laminations of a second stator core once the second laminations are inserted into desired axial positions within the main housing. The rails are removably installed in the main housing, such that after the second laminations of the second stator core are all installed and secured within the main housing, the rails can be detached from the frame rings and removed from the main housing while still preserving an intended use of the stator frame. The trolley is provided for axial movement on the upper surfaces of the rails for inserting the second laminations into the main housing. The trolley comprises a lamination-engaging portion including a lamination support surface for supporting upper support surfaces of the second laminations and a plurality of rail wheels provided for axial movement of the trolley within the main housing on the upper surfaces of the rails.

BRIEF DESCRIPTION OF THE DRAWINGS

While the specification concludes with claims particularly pointing out and distinctly claiming the present invention, it is believed that the present invention will be better understood from the following description in conjunction with the accompanying Drawing Figures, in which like reference numerals identify like elements, and wherein:

DETAILED DESCRIPTION OF THE INVENTION

In the following detailed description of the preferred embodiment, reference is made to the accompanying drawings that form a part hereof, and in which is shown by way of illustration, and not by way of limitation, a specific preferred embodiment in which the invention may be practiced. It is to be understood that other embodiments may be utilized and that changes may be made without departing from the spirit and scope of the present invention.

After periods of electrical power generator use, it may become necessary to replace a stator core within a stator frame of the power generator, as the stator frame may become worn out or damaged over time. As mentioned above, U.S. Patent/Publication Nos. U.S. Pat. Nos. 7,302,754; 7,353,586; 7,395,594 and 2009/0235516 are directed at installing stator cores into stator frames without placing the stator frame in an upright position. In each of these patents, keybars are directly coupled to the stator core laminations and to the stator frame to structurally support the stator core within the frame.

In accordance with the present invention, a method for servicing a stator frame comprising installing a replacement stator core into the stator frame while the stator frame is in a horizontal position, wherein keybars of the stator frame are not directly coupled to a main housing of the stator frame so as to support the stator core within the main housing, has been developed.

Figures 1, 3:
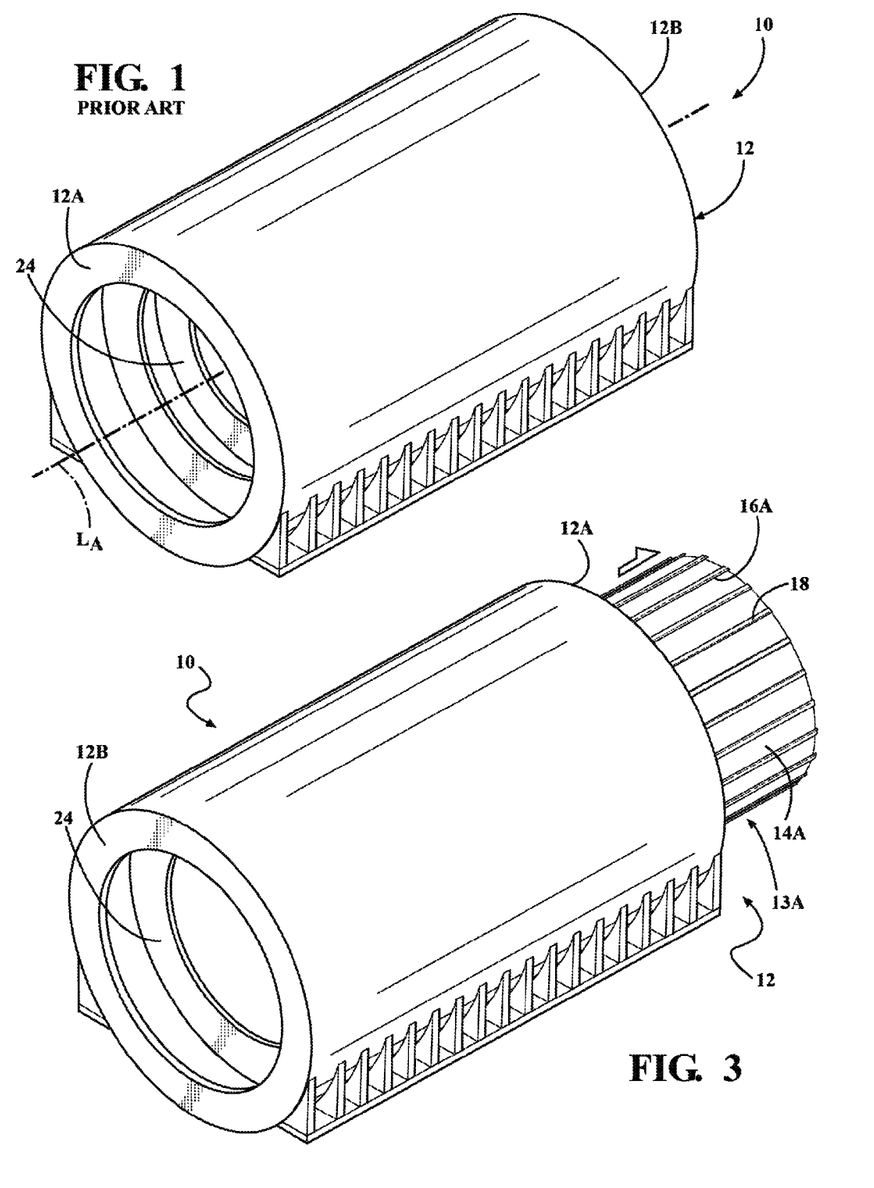
FIG. 1 is a perspective view of a prior art stator frame of the type to be serviced in accordance with the present invention.
FIG. 3 is a perspective view of the stator frame of FIG. 1 undergoing a step in a servicing operation according to the present invention.
Figure 2:
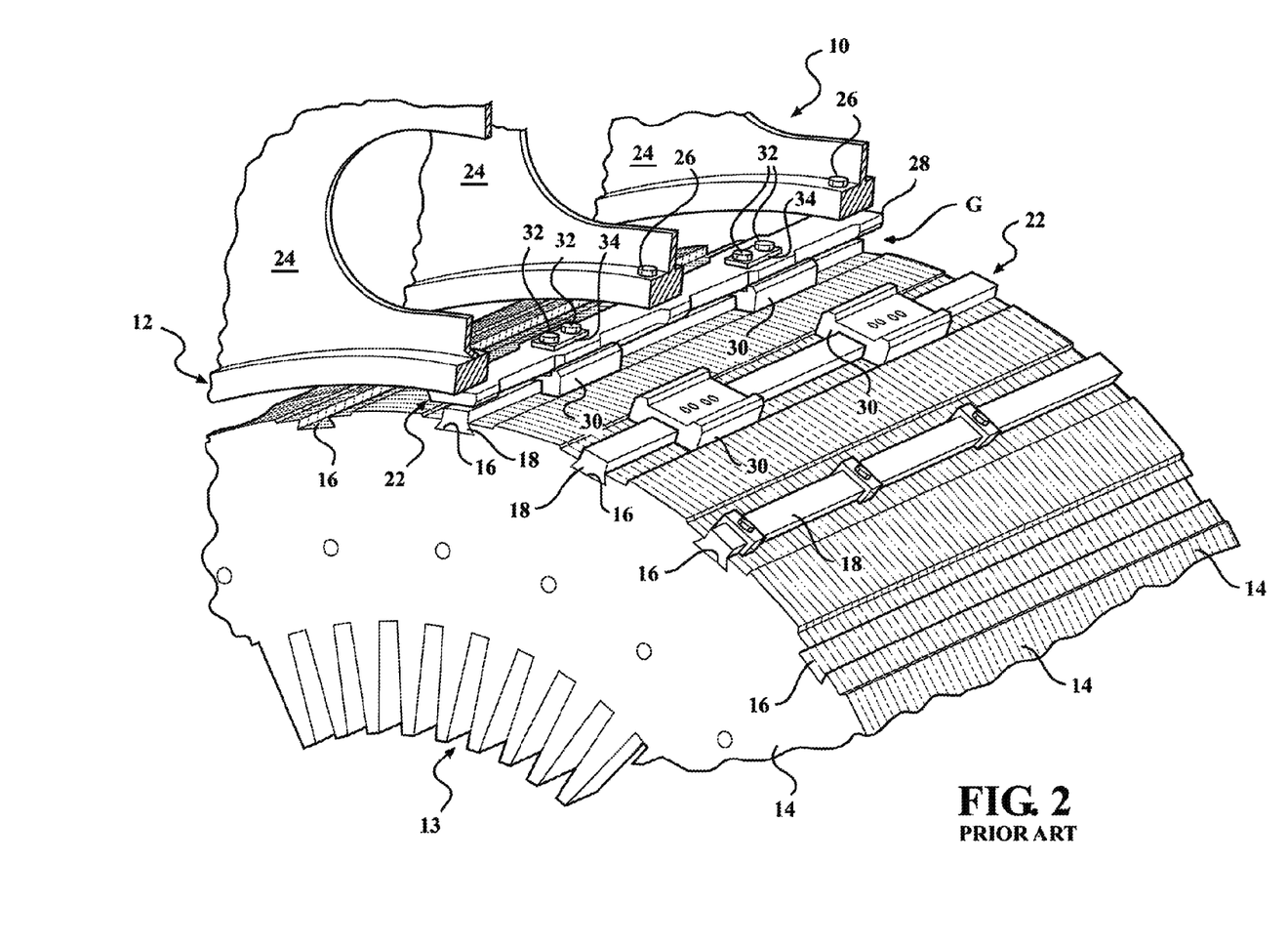
FIG. 2 is a perspective view of a portion of the stator frame of FIG. 1, illustrating a plurality of spring assemblies that are provided for supporting a stator core within the stator frame.

FIGS. 1 and 2 illustrate a known stator frame 10 of the type to be serviced in accordance with the present invention. The stator frame 10 comprises a main housing 12 having a first end 12A and a second end 12B spaced apart from the first end 12A along a longitudinal axis $L_A$ defining an axial direction of the frame 10, see FIG. 1. The first end 12A of the main housing 12 may be referred to as an "exciter end" and the second end 12B of the main housing 12 may be referred to as a "turbine end".

The main housing 12 supports a stator core 13, which comprises a plurality of stacked laminations 14 or groups of stacked laminations 14, which groups are typically referred to as donuts, see FIG. 2. It is noted that the stator core 13 has been removed from FIG. 1 for clarity. It is further noted that thicknesses of the laminations 14 have been exaggerated in FIG. 2 for clarification purposes, and that typical laminations 14 have thicknesses of about 0.50 mm. Each stator core lamination 14 includes a plurality of slots or grooves 16 along its outer periphery to receive corresponding dove-tail shaped building bolts or keybars 18. The grooves 16 have a dove-tail shape corresponding to the shape of the keybars 18 to ensure a secure and tight fit therebetween. It is noted that some of the keybars 18 have been removed from the grooves 16 in FIG. 2 for clarity.

As shown in FIG. 2, the stator frame 10 further includes a plurality of spring assemblies 22 that are affixed to frame rings 24 of the main housing 12 via mounting structures, e.g., bolts 26. Similar spring assemblies 22 are illustrated in U.S. Pat. No. 6,144,129, the entire disclosure of which is incorporated by reference herein. It is noted that some of the spring assemblies 22 have been removed in FIG. 2 for clarity, and that each of the keybars 18 will have a spring assembly 22 associated with it.

The spring assemblies 22 comprise axial spring members 28 that are affixed to the frame rings 24 of the main housing 12 by the bolts 26 (only one spring member 28 is shown in FIG. 2 for clarity), key blocks 30, also known as spacer members, that create gaps G to provide desired spacing between the spring members 28 and the stator core 13 (some of the key blocks 30 have been removed from FIG. 2 for clarity), and fastening hardware, e.g., bolts 32, for securing the keybars 18 to the spring members 28 with the key blocks 30 disposed between the spring members 28 and the keybars 18. The coupling of the keybars 18 to the spring members 28 and the affixation of the spring members 28 to the frame rings 24 structurally supports the stator core 13 within the stator frame 10. This is in contrast with other types of stator frames, wherein keybars affixed to the stator core are mounted directly to the frame rings, i.e., wherein spring assemblies, such as the spring assemblies 22, are not provided.

Referring still to FIG. 2, brackets 34, which may comprise washer structures with two holes for receiving the bolts 32, may be provided between the head ends of the bolts 32 and the key blocks 30

A servicing operation according to the present invention for servicing a stator frame, such as the stator frame 10 illustrated in FIGS. 1 and 2, will now be described. Referring to FIG. 3, a first stator core 13A is removed from the main housing 12 of the stator frame 10. Removing the first stator core 13A may comprise detaching keybars 18 provided in grooves 16A in peripheral outer surfaces of first laminations 14A of the first stator core 13A from the spring assemblies 22 affixed to the frame rings 24 of the stator frame 10, and subsequently removing the first laminations 14A from the main housing 12 of the stator frame 10. Detaching the keybars 18 from the spring assemblies 22 may comprise removing the bolts 32 from the keybars 18 so as to release the keybars 18 from the spring members 28.

Once the first stator core 13A is removed, or, as the first stator core 13A is being removed, the bolts 32 and the key blocks 30 of the spring assemblies 22 are preferably removed from the main housing 12. This is done such that second laminations 14B of a second stator core 13B to be installed in the main housing 12, see FIGS. 5 and 6, can be inserted into the main housing 12 without contacting the bolts 32 or the key blocks 30.

The keybars 18 are then removed from the grooves 16A in the first laminations 14A, e.g., by sliding the keybars 18 axially out from the grooves 16A. According to one aspect of the present invention, the keybars 18 may be set aside for use with the second stator core 13B, as will be described herein.

Figure 4:
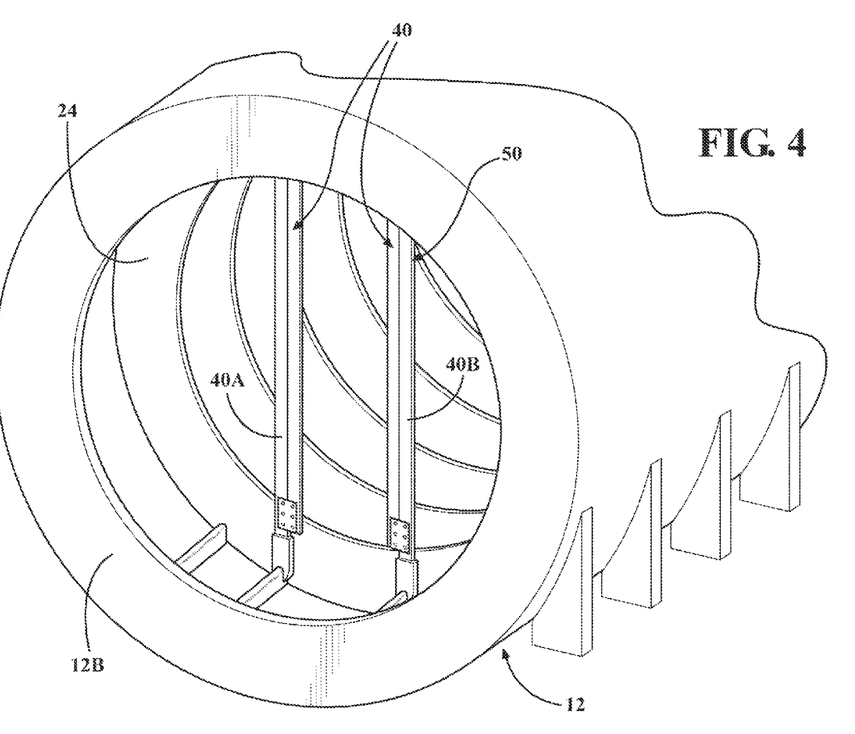
FIG. 4 is a perspective view showing a portion of the stator frame of FIG. 1 and illustrating a backstop structure of a support assembly used for servicing the stator frame according to the present invention.

Referring to FIG. 4, a backstop structure 40 of a support assembly 50 is temporarily installed at the second end 12B of the main housing 12. The backstop structure 40 is secured to the second end 12B of the main housing 12 to provide axial positioning for the second laminations 14B of the second stator core 13B within the main housing 12, and also to provide a reaction surface when performing core consolidation (pressing) operations. As shown in FIG. 4, the backstop structure 40 may comprise one or more structural, rigid members 40A, 40B that are affixed to the frame rings 24 of the main housing 12 and that span the opening at the second end 12B of the main housing 12 such that the second laminations 14B of the second stator core 13B do not fall out of the second end 12B through the opening when they are being inserted into desired axial positions within the main housing 12, as will be discussed below.

The support assembly 50, which is used to insert the second laminations 14B of the second stator core 13B into the main housing 12, is illustrated in FIGS. 4-8. It is noted that the spring assemblies 22, including the spring members 28, have been removed from FIGS. 4-8 for clarity. The support assembly 50 comprises the backstop structure 40, a trolley 52, and a rail assembly 54 comprising a plurality of rails 56 that extend axially within a bottom portion 12C of the main housing 12 and are supported within the main housing 12 on the frame rings 24. The trolley 52 and the rails 56 are formed from high strength materials and are capable of structurally supporting the weight of one or more of the second laminations 14B as they are being inserted into the main housing 12.

The trolley 52 comprises front rail wheels 58A, rear rail wheels 58B, and at least one deck wheel 58C. The front and rear rail wheels 58A, 58B are supported on the rails 56 of the rail assembly 54 and are provided for axial movement of the trolley 52 within the main housing 12 (see FIGS. 5-7). The at least one deck wheel 58C is supported on a floor surface, which comprises a turbine deck $T_D$ in the embodiment shown, see FIG. 7, and is provided for axial movement of the trolley 52 while outside of the main housing 12. The rear rail wheels 58B are pivotable or otherwise movable so as to be positionable in rail engaging positions (see FIG. 5) when inside the main housing 12 so the rear rail wheels 58B can roll on the rails 56, and also in upper, floating positions (see FIG. 6) when outside of the main housing 12 so the rear rail wheels 58B are clear of the turbine deck $T_D$ when the rear end of the trolley 52 is positioned outside of the main housing 12. It is noted that the rear rail wheels 58B are illustrated in their upper, floating positions in solid lines in FIG. 7, and are illustrated in their lower, rail engaging positions in dashed lines in FIG. 7. Further, the at least one deck wheel 58C may be capable of being moved vertically, e.g., such that the trolley 52 can be used in servicing operations wherein floor surfaces, e.g., a turbine deck or other floor surface, are at different heights relative to the rails 56.

Figure 5:
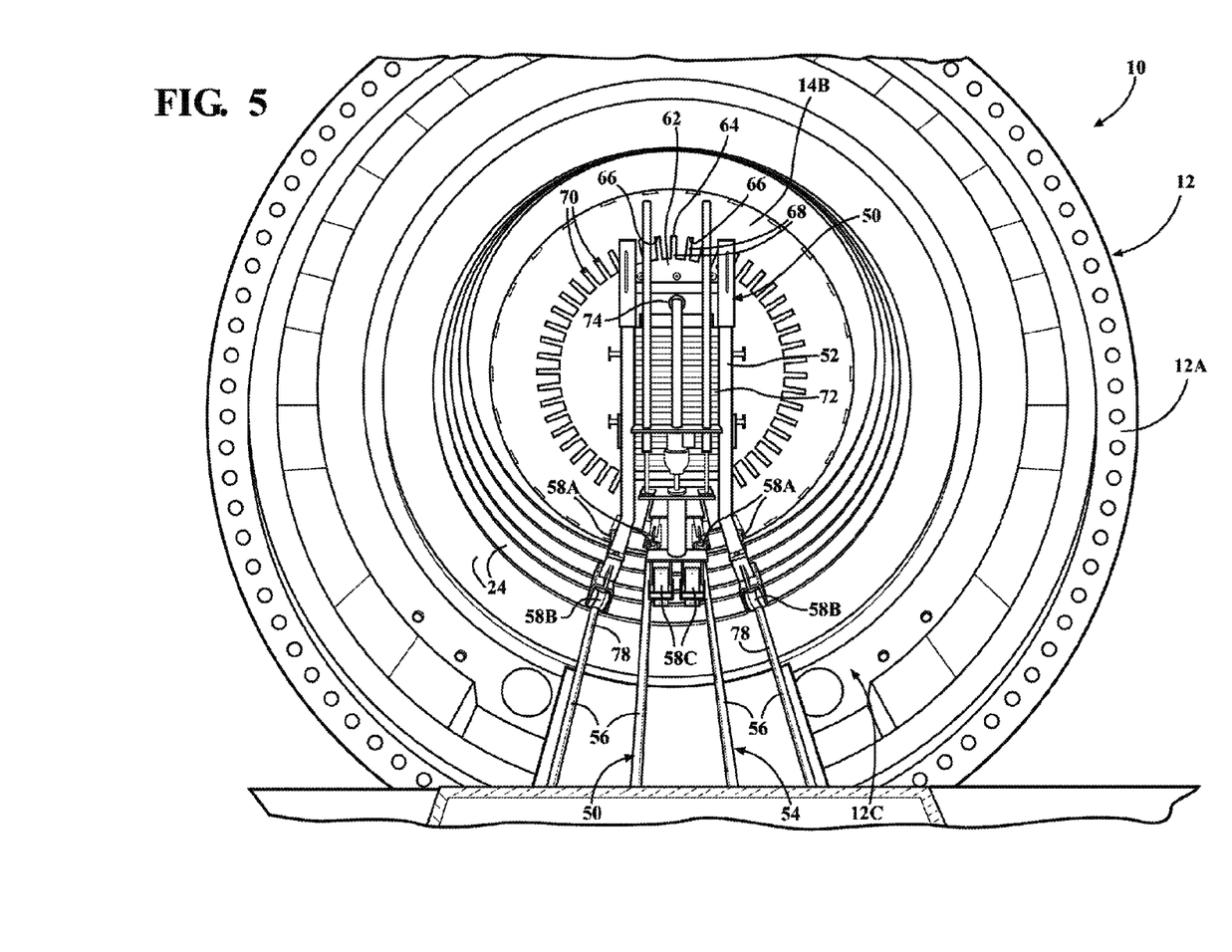
FIGS. 5 and 6 are exciter and turbine end views, respectively, of the stator frame of FIG. 1 undergoing additional steps in the servicing operation according to the invention.
Figure 6:
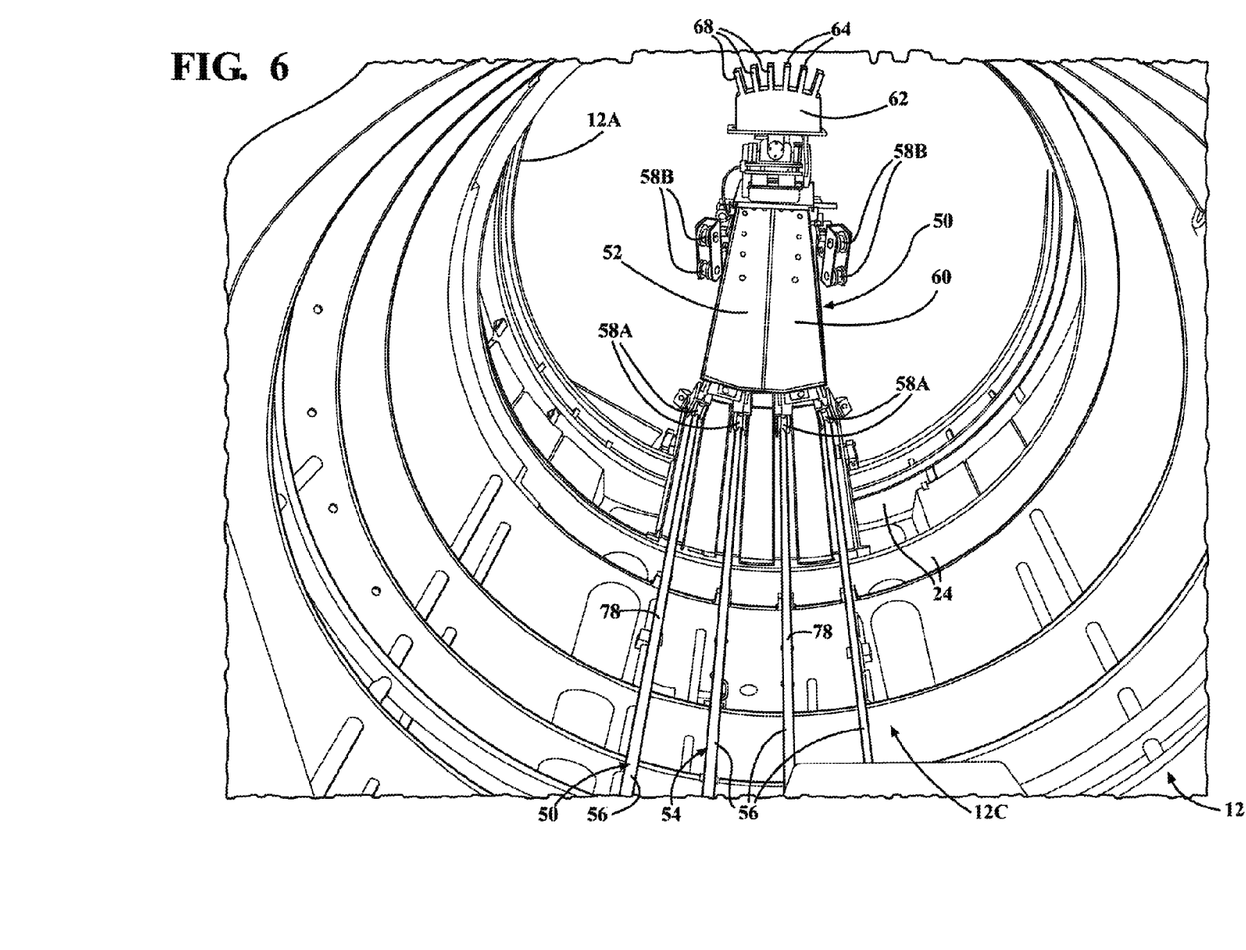
Figure 7:
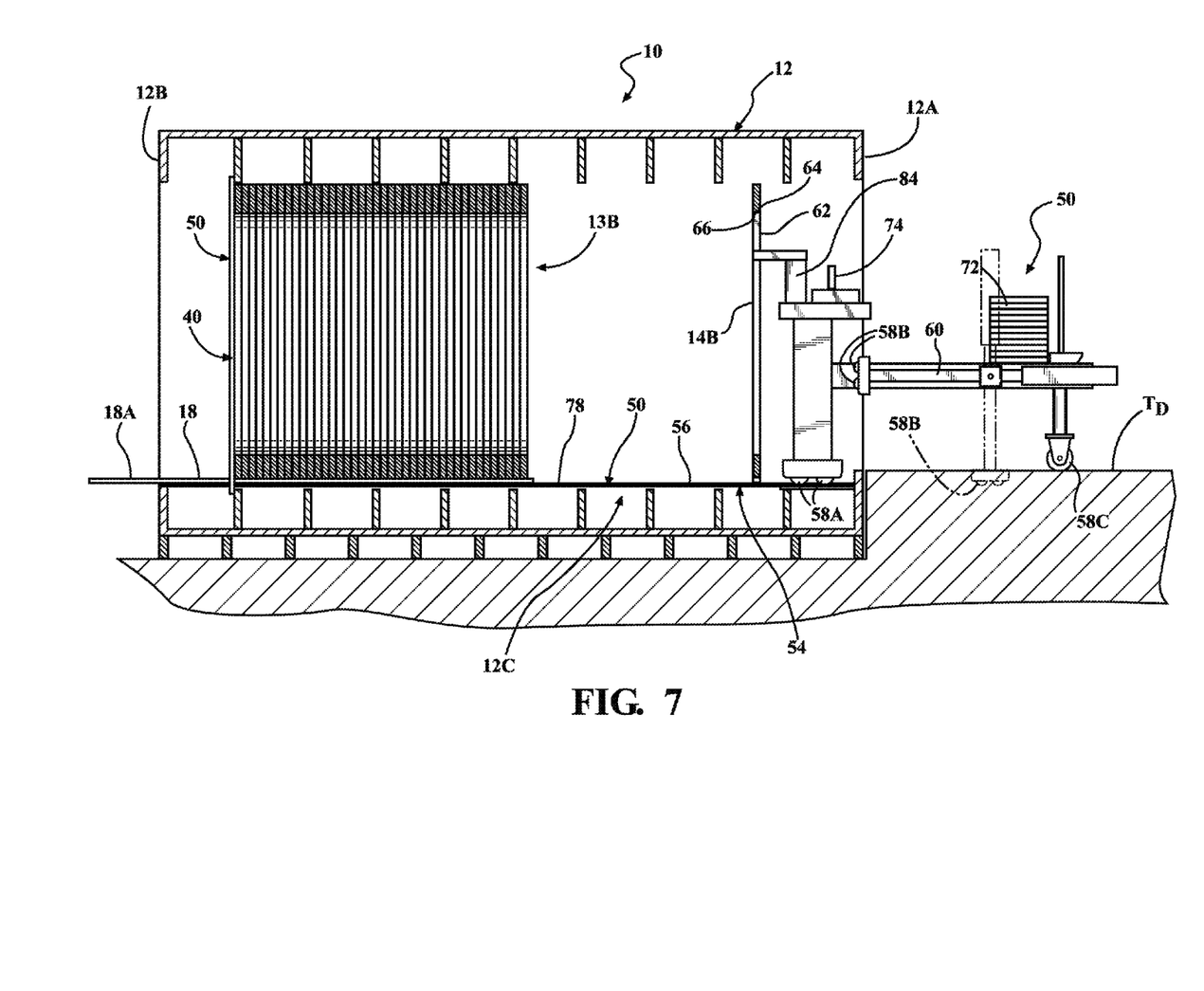
FIG. 7 is a schematic illustration of the stator frame of FIG. 1 and the support assembly used for servicing the stator frame according to the present invention.
Figure 8:
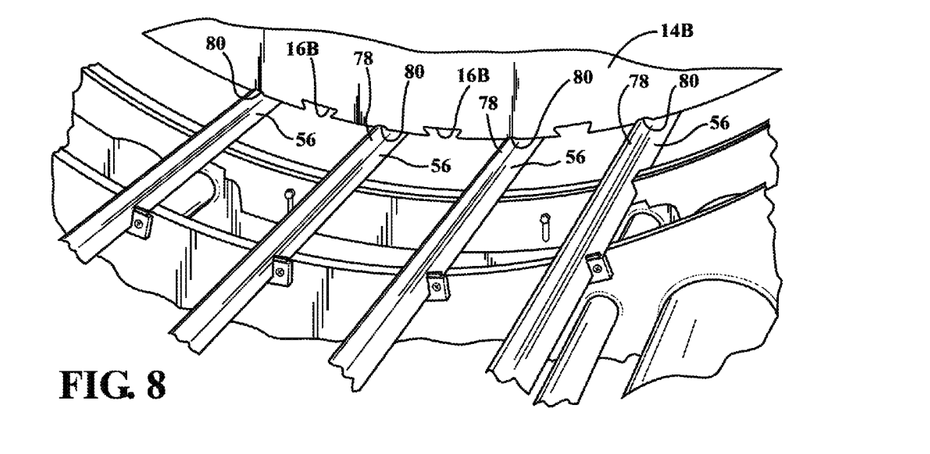
FIG. 8 is a perspective view of a portion of a lamination and rails of the support assembly used for servicing the stator frame according to the present invention.

The trolley 52 is provided for axial movement on the rails 56, see FIGS. 5-7, and further comprises a main body 60, see FIGS. 6 and 7, from which the wheels 58A-C extend, and a lamination-engaging portion 62 that extends upwardly from the main body 60. The lamination-engaging portion 62 includes a lamination support surface 64 for engaging upper support surfaces 66 of the second laminations 14B, see FIGS. 5-7. As illustrated in FIG. 5, the lamination support surface 64 of the lamination-engaging portion 62 in the embodiment shown includes a plurality of fingers 68 that are received in corresponding grooves 70 of the second laminations 14B. The fingers 68 and the grooves 70 provide a tongue and groove fit to support the second laminations 14B on the trolley 52.

The main body 60 may further include counterweights 72 that are provided for stabilizing the trolley 52 while it is supporting the weight of one or more of the second laminations 14B as they are being inserted into the main housing 12. The counterweights 72 are preferably placed over or in the vicinity of the deck wheels 58C, as the one or more of the second laminations 14B are supported on the lamination-engaging portion 62, which is on the opposite end of the trolley 52 near the front rail wheels 58A. Additional counterweights than those shown may also be employed as desired.

In the embodiment shown, a dial indicator 74 is provided on the main body 60 of the trolley 52, see FIGS. 5 and 7. As will be apparent to those skilled in the art, the dial indicator 74 is capable of accurately measuring small linear distances and is used to provide assistance to operators for correctly positioning the second laminations 14B on the trolley 52 and in the main housing 12.

Referring to FIGS. 5-8, upper surfaces 78 of the rails 56 provide support for the front and rear rail wheels 58A, 58B of the trolley 52 and provide temporary support for lower support surfaces 80 (see FIG. 8) of the second laminations 14B once they are inserted into desired axial positions within the main housing 12. Once the second laminations 14B are secured within the main housing 12, as will be described below, the rails 56 are no longer needed to provide support for the second laminations 14B of the second stator core 13B, such that the rails 56 can be removed from the main housing 12 while still preserving an intended use of the stator frame 10, as will be discussed below.

A method for installing a replacement stator core, referred to herein as the second stator core 13B, into the main housing 12 will now be described. One or more second laminations 14B of the second stator core 13B is positioned on the trolley 52 such that the grooves 70 of the second laminations 14B receive the fingers 68 of the lamination-engaging portion 62 in a tongue and groove fit, see FIG. 5. Positioning the second laminations 14B in this manner provides structural support for the upper support surfaces 66 of the second laminations 14B on the lamination support surface 64 of the lamination-engaging portion 62 of the trolley 52, such that the entire weight of the one or more second laminations 14B is supported on the trolley 52.

Once the one or more second laminations 14B to be carried into the main housing 12 is positioned on the trolley 52, which may be accomplished with the use of an overhead crane (not shown), the trolley 52 is moved toward the second end 12B of the main housing 12 so as to carry the second laminations 14B into the main housing 12, see FIGS. 5 and 7. As the second laminations 14B are carried axially within the main housing 12, notches 82 (see FIG. 8) formed in the outer edges of the second laminations 14B receive the rails 56 such that the second laminations 14B do not contact the rails 56 as they are being carried into the main housing 12 on the trolley 52.

As the trolley 52 is moved axially into the main housing 12, the rear rail wheels 58B of the trolley 52 eventually move to axial positions where they are located over the rails 56 within the main housing 12 and are no longer located over the turbine deck $T_D$. After this occurs, the rear rail wheels 58B are moved, e.g., pivoted downward in the case of the illustrated rear rail wheels 58B, so they engage the rails 56. Once the rear rail wheels 58B are positioned on the rails 56, the deck wheel (s) 58C may optionally be moved vertically upward to move out of contact with the turbine deck $T_D$. Once the deck wheel (s) 58C is/are no longer engaged with the turbine deck $T_D$, the entire weight of the trolley 52, including the weight of any second laminations 14B being carried by the trolley 52, is supported on the rails 56. It is noted that the rails 56 are required to support the trolley 52 for the particular frame 10 being serviced according to the present invention, as the spring assemblies 22, and more particularly the spring members 28, are not capable of supporting the trolley 52 as the laminations 14B are being inserted into the main housing 12.

The first group of one or more second laminations 14B that are inserted into the main housing 12 are carried axially by the trolley 52 within the main housing 12 until the second lamination 14B that will be positioned closest to the second end 12B of the main housing 12 contacts the backstop structure 40. At this point, the trolley 52 lowers the one or more second laminations 14B onto the rails 56 using a pump 84, such as a hydraulic or pneumatic pump see FIG. 7, such that the lower support surfaces 80 of the second laminations 14B are temporarily supported on the rails 56. It is noted that the notches 82 formed in the outer edges of the second laminations 14B are intended to assist in preventing the second laminations 14B from moving circumferentially once they are set down on the rails 56. Additional structures (not shown) such as blocks or wedges, may provide additional assistance in preventing the second laminations 14B from moving circumferentially once they are set down on the rails 56.

Subsequent groups of one or more second laminations 14B, which groups of laminations are typically referred to as "donuts" as noted above, are carried into the main housing 12 on the trolley 52 until they contact the most recently installed second laminations 14B. The lamination inserting procedure is repeated in this manner until a predetermined number of second laminations 14B are inserted into the main housing 12.

According to one aspect of the present invention, after a predetermined number of second laminations 14B have been inserted into the main housing 12, e.g., about half of the second laminations 14B according to one exemplary embodiment, keybars 18 may be inserted into at least lower ones of grooves 16B formed in the outer surfaces of the inserted second laminations 14B. This is done, as space restrictions may make it difficult to install the keybars 18 into the lower ones of the grooves 16B once all of the second laminations 14B are inserted into the main housing 12. As shown in FIG. 7, ends 18A of the keybars 18 associated with the second end 12B of the main housing 12 may extend axially out from the second end 12B of the main housing 12 until the remaining second laminations 14B of the second stator core 13B are inserted into the main housing 12. After the remaining second laminations 14B are inserted into the main housing 12, i.e., using the support assembly 50, the remaining keybars 18 can be installed, and the keybars 18 that were previously installed into the lower ones of the grooves 16B can be axially moved toward the first end 12A of the main housing 12 such that they are received in lower ones of grooves 16B formed the remaining second laminations 14B.

Figure 9:
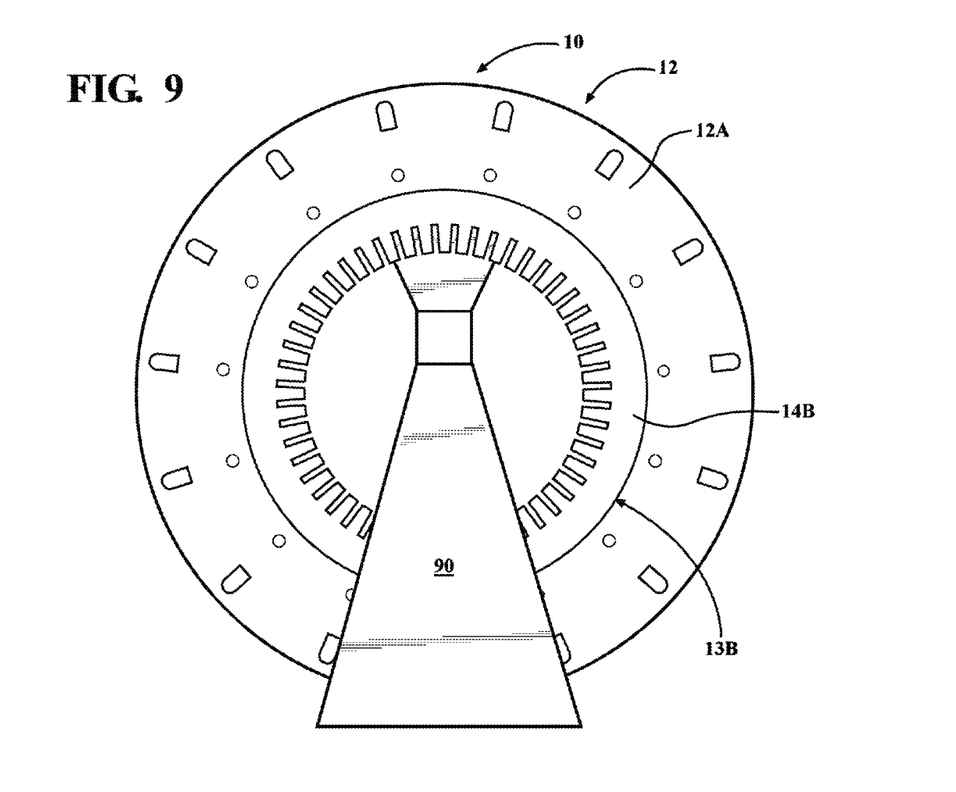
FIG. 9 is an end view of the stator frame of FIG. 1 and a lift assembly used for servicing the stator frame according to the present invention.

Referring to FIG. 9, once the second laminations 14B are all inserted into the main housing 12, a temporary lift assembly 90 may be used to move the second stator core 13B to a desired vertical position within the main housing 12. For example, the second stator core 13B may need to be raised slightly to be in a proper position such that it can be secured to the main housing 12, i.e., with the spring assemblies 22 as described above with reference to FIG. 2. Specifically, the keybars 18 provided in the grooves 16B of the second laminations 14B may need to be raised so they can be attached to the spring members 28 with the bolts 32, wherein the key blocks 30 are disposed between the spring members 28 and the keybars 18. As noted above, the same keybars 18 that were removed from the first laminations 14A of the first stator core 13A, as well as the same spring assemblies 22 that were used to secure the first stator core 13A to the main housing 12, may be used to secure the second laminations 14B of the second stator core 13B to the main housing 12. It is noted that the configuration of the lift assembly 90 illustrated in FIG. 9 is exemplary and the lift assembly 90 could have any suitable configuration.

Once the second stator core 13B is secured within the main housing 12 of the stator frame 10, the rails 56 of the support assembly 50 can be removed from the main housing 12, and the backstop structure 40 can be removed from the second end 12B of the main housing 12. Also, additional procedures can be employed to finalize the stator frame 10 for use, such as installing fingerplates (not shown) and end plates (not shown) at the first and second ends 12A, 12B of the main housing 12, performing a core compaction cycle, testing cycles, tightening of components, etc., each of which is known in the art and will not be described in detail herein. As noted above, the rails 56 can be removed from the frame rings 24 of the main housing 12, as the rails 56 are not needed for intended operation of the stator frame 10 once the second stator core 13B is installed and secured within the main housing 12, i.e., since the rails 56 are not required to structurally support the second stator core 13B once the second stator core 13B is supported within the main housing 12 by the spring assemblies 22.

The methods and the support assembly 50 described herein enable the replacement of stator cores in stator frames while the stator frames are maintained in horizontal positions, wherein keybars of the stator frame are not directly coupled to a main housing of the stator frame so as to support the stator core within the main housing.

While particular embodiments of the present invention have been illustrated and described, it would be obvious to those skilled in the art that various other changes and modifications can be made without departing from the spirit and scope of the invention. It is therefore intended to cover in the appended claims all such changes and modifications that are within the scope of this invention.

What is claimed is:

1. A support assembly for servicing a stator frame of a power generator, the stator frame including a main housing having a first end and an axially spaced apart second end and supporting a stator core formed by a plurality of laminations that have grooves formed in outer surfaces thereof for receiving respective axially extending keybars to couple the keybars to the laminations, the stator frame further including a plurality of spring assemblies comprising spring members affixed to frame rings of the main housing, spacer blocks for providing a gap between the laminations of the stator core and the spring members, and fastening hardware that is used to attach the keybars provided in the grooves of the laminations to the spring members so as to structurally support the stator core within the main housing, the support assembly comprising:
   a plurality of rails supported on the frame rings of the main housing and extending axially within a bottom portion of the main housing, the rails having upper surfaces that provide temporary support for lower support surfaces of second laminations of a second stator core once the second laminations are inserted into desired axial positions within the main housing;
   a backstop structure affixed to the main housing to provide axial positioning for the second laminations of the second stator core within the main housing; and
   a trolley provided for axial movement on the upper surfaces of the rails for inserting the second laminations into the main housing, the trolley comprising:
      a lamination-engaging portion including a lamination support surface for supporting upper support surfaces of the second laminations;
      a plurality of rail wheels provided for axial movement of the trolley within the main housing on the upper surfaces of the rails; and
      at least one counterweight provided to stabilize the trolley while at least one second lamination is supported on the trolley.

2. The support assembly according to claim 1, wherein the rails are removably installed in the main housing, such that after the second laminations of the second stator core are all installed and secured within the main housing, the rails can be detached from the frame rings and removed from the main housing while still preserving an intended use of the stator frame.

3. The support assembly according to claim 1, wherein the trolley further comprises a dial indicator to assist in correctly positioning at least one second lamination on the trolley.

4. The support assembly according to claim 1, wherein the rail wheels comprise front rail wheels and rear rail wheels spaced apart from the front rail wheels in the axial direction.

5. The support assembly according to claim 4, wherein the rear rail wheels are movable from rail engaging positions when inside the main housing to floating positions when outside of the main housing.

6. The support assembly according to claim 1, further comprising at least one deck wheel provided for axial movement of the trolley outside of the main housing on a floor surface.

7. The support assembly according to claim 6, wherein the at least one deck wheel is vertically movable to accommodate floor surfaces of different heights relative to the rails.

8. The support assembly according to claim 1, wherein the backstop structure comprises at least one structural member affixed at the second end of the main housing, the at least one structural member spanning an opening at the second end of the main housing such that the second laminations of the second stator core do not fall out of the opening at the second end of the main housing when they are being installed.

9. A support assembly for servicing a stator frame of a power generator, the stator frame including a main housing having a first end and an axially spaced apart second end and supporting a stator core formed by a plurality of laminations that have grooves formed in outer surfaces thereof for receiving respective axially extending keybars to couple the keybars to the laminations, the stator frame further including a plurality of spring assemblies comprising spring members affixed to frame rings of the main housing, spacer blocks for providing a gap between the laminations of the stator core and the spring members, and fastening hardware that is used to attach the keybars provided in the grooves of the laminations to the spring members so as to structurally support the stator core within the main housing, the support assembly comprising:
   a plurality of rails supported on the frame rings of the main housing and extending axially within a bottom portion of the main housing, the rails having upper surfaces that provide temporary support for lower support surfaces of second laminations of a second stator core once the second laminations are inserted into desired axial positions within the main housing; and
   a trolley provided for axial movement on the upper surfaces of the rails for inserting the second laminations into the main housing, the trolley comprising:
      a lamination-engaging portion including a lamination support surface for supporting upper support surfaces of the second laminations;
      a plurality of rail wheels provided for axial movement of the trolley within the main housing on the upper surfaces of the rails; and
      at least one deck wheel provided for axial movement of the trolley outside of the main housing on a floor surface.

10. The support assembly according to claim 9, further comprising a backstop structure affixed to the main housing to provide axial positioning for the second laminations of the second stator core within the main housing.

11. The support assembly according to claim 10, wherein the backstop structure comprises at least one structural member affixed at the second end of the main housing, the at least one structural member spanning an opening at the second end of the main housing such that the second laminations of the second stator core do not fall out of the opening at the second end of the main housing when they are being inserted into the main housing.

12. The support assembly according to claim 9, wherein the rails are removably installed in the main housing, such that after the second laminations of the second stator core are all installed and secured within the main housing, the rails can be detached from the frame rings and removed from the main housing while still preserving an intended use of the stator frame.

13. The support assembly according to claim 9, wherein the trolley further comprises:
   a dial indicator to assist in correctly positioning at least one second lamination on the trolley.

14. The support assembly according to claim 9, wherein the rail wheels comprise front rail wheels and rear rail wheels spaced apart from the front rail wheels in the axial direction, wherein the rear rail wheels are movable from rail engaging positions when in the main housing to floating positions when out of the main housing.

15. The support assembly according to claim 9, wherein the at least one deck wheel is vertically movable to accommodate floor surfaces of different heights relative to the rails.

16. The support assembly according to claim 9, wherein the trolley further comprises:

at least one counterweight provided to stabilize the trolley while at least one second lamination is supported on the trolley.

17. A support assembly for servicing a stator frame of a power generator, the stator frame including a main housing having a first end and an axially spaced apart second end and supporting a stator core formed by a plurality of laminations that have grooves formed in outer surfaces thereof for receiving respective axially extending keybars to couple the keybars to the laminations, the stator frame further including a plurality of spring assemblies comprising spring members affixed to frame rings of the main housing, spacer blocks for providing a gap between the laminations of the stator core and the spring members, and fastening hardware that is used to attach the keybars provided in the grooves of the laminations to the spring members so as to structurally support the stator core within the main housing, the support assembly comprising:

a plurality of rails supported on the frame rings of the main housing and extending axially within a bottom portion of the main housing, the rails having upper surfaces that provide temporary support for lower support surfaces of second laminations of a second stator core once the second laminations are inserted into desired axial positions within the main housing;

a backstop structure affixed to the main housing to provide axial positioning for the second laminations of the second stator core within the main housing, the backstop structure comprising at least one structural member affixed at the second end of the main housing, the at least one structural member spanning an opening at the second end of the main housing such that the second laminations of the second stator core do not fall out of the opening at the second end of the main housing when they are being inserted into the main housing; and a trolley provided for axial movement on the upper surfaces of the rails for inserting the second laminations into the main housing, the trolley comprising:

a lamination-engaging portion including a lamination support surface for supporting upper support surfaces of the second laminations; and a plurality of rail wheels provided for axial movement of the trolley within the main housing on the upper surfaces of the rails.

18. The support assembly according to claim 17, wherein:
the rail wheels comprise front rail wheels and rear rail wheels spaced apart from the front rail wheels in the axial direction; and
only the rear rail wheels are movable from rail engaging positions when in the main housing to floating positions when out of the main housing.

19. The support assembly according to claim 17, wherein the trolley further comprises at least one deck wheel provided for axial movement of the trolley outside of the main housing on a floor surface, the at least one deck wheel being vertically movable to accommodate floor surfaces of different heights relative to the rails.

20. The support assembly according to claim 17, wherein the rails are removably installed in the main housing, such that after the second laminations of the second stator core are all installed and secured within the main housing, the rails can be detached from the frame rings and removed from the main housing while still preserving an intended use of the stator frame.

\* \* \* \* \*